Sept. 30, 1952 F. B. CALDWELL 2,612,316

METEOROLOGICAL CALCULATING MECHANISM

Filed Oct. 16, 1951 2 SHEETS—SHEET 1

INVENTOR.
Frederic B. Caldwell
BY
Banning & Banning
Attys.

Sept. 30, 1952 F. B. CALDWELL 2,612,316

METEOROLOGICAL CALCULATING MECHANISM

Filed Oct. 16, 1951 2 SHEETS—SHEET 2

INVENTOR.
Frederic B. Caldwell
BY Dunning & Dunning
Attys.

Patented Sept. 30, 1952

2,612,316

UNITED STATES PATENT OFFICE 2,612,316

METEOROLOGICAL CALCULATING MECHANISM

Frederic B. Caldwell, Evanston, Ill.

Application October 16, 1951, Serial No. 251,588

5 Claims. (Cl. 235—61)

This invention relates to a metering device, and more particularly to a device for measuring and predicting the depletion of a supply of material which is consumed at a predetermined rate, which rate may be accelerated or decelerated in accordance with variations in a condition.

While it will be readily apparent to those skilled in the art that the device of this invention has many applications, for the purposes of exemplary disclosure the invention has been shown as incorporated in a device for predicting the depletion of a supply of fuel, such as fuel oil.

A great number of homes, apartments, hotels, factories and the like are heated with oil. In most instances the oil is stored on the premises in suitable tanks which must be filled whenever necessary in order constantly to preserve a continuously available supply of fuel. In many cases the owner or operator or other establishment requests what is known as "automatic service" from the dealer or supplier of fuel oil so that the responsibility of maintaining adequate supply of fuel rests upon the supplier.

One of the principal items of expense in the operation of a fuel oil business is the cost of the equipment and labor necessary for delivering oil to the user's premises. In the interest of economy, therefore, the supplier finds it essential to make the deliveries at as widely spaced intervals as possible, as the difference in cost in making, for example, two deliveries of 200 gallons each and one delivery of 400 gallons may mean the difference between a profit or a loss on the sale. However, if the supplier has the responsibility of insuring that a constant supply of oil is always available in the tanks of his customers he cannot wait until the tank is substantially empty.

Under these circumstances it is necessary that the supplier have some means of determining when the available supply of fuel oil in a customer's tank becomes depleted so that at or just before that time a delivery can be made. A delivery at that time enables the supplier not only to fulfill his commitments to the customer to maintain a supply of fuel in the tank but also to realize the maximum profit on the sale inasmuch as the maximum quantity of oil was delivered in a single trip.

In determining when a delivery of oil should be made, the mere elapse of a definite time period cannot be relied upon to indicate the fuel oil requirements of any customer. In any given time period, for example thirty days, the area serviced by the supplier may have enjoyed an unusually warm spell or have been subjected to an unusually cold spell. Any such deviation from normal temperature results in an abnormal consumption of fuel oil. Delivery at the end of such a period where the temperature was above normal will result in the sale of a relatively small volume of oil while to delay the delivery thirty days during a severely cold spell may result in the customer running out of oil before delivery is made.

This invention is admirably suited for use by a supplier of fuel oil and when used by him will indicate with a remarkable degree of accuracy the time when further deliveries are required. The time when deliveries are required are foretold not by reference to the passage of any predetermined period of time but rather by reference to the weather conditions that actually existed in the area serviced. Furthermore, the apparatus of this invention takes into account such factors as the dead storage in a tank and allows a predetermined reserve sufficient to carry the user over a short extremely severe cold snap.

The device of this invention utilizes each customer's rate of consumption as expressed in gallons per degree day and applies that rate against degree days which may accrue to the next refilling period to indicate when that period has arrived. As is well known, a degree day is the number of degrees below 65° F. of the mean temperature in any given twenty-four hour period. Thus if the mean temperature of any day is 64° F., then one degree day has accrued. If the mean temperature in any day is 20° F. in that one day 45 degree days accrue. The customer's rate of consumption of fuel oil can readily be determined from a review of the past history of the consumer by dividing the number of gallons of fuel oil used in a given period by the number of degree days accruing in that same period. Thus if during the month of January, for example, there accrued 1,000 degree days and the customer used 500 gallons of fuel oil, the customer's rate is one-half gallon per degree day.

The above and further features of the invention will be apparent from the following description and drawings, in which:

Fig. 1 is a top plan view of a device embodying the invention;

Figs. 2, 3, 4 and 5 are sectional views along lines 2—2, 3—3, 4—4 and 5—5 respectively of Fig. 1;

Figure 1:
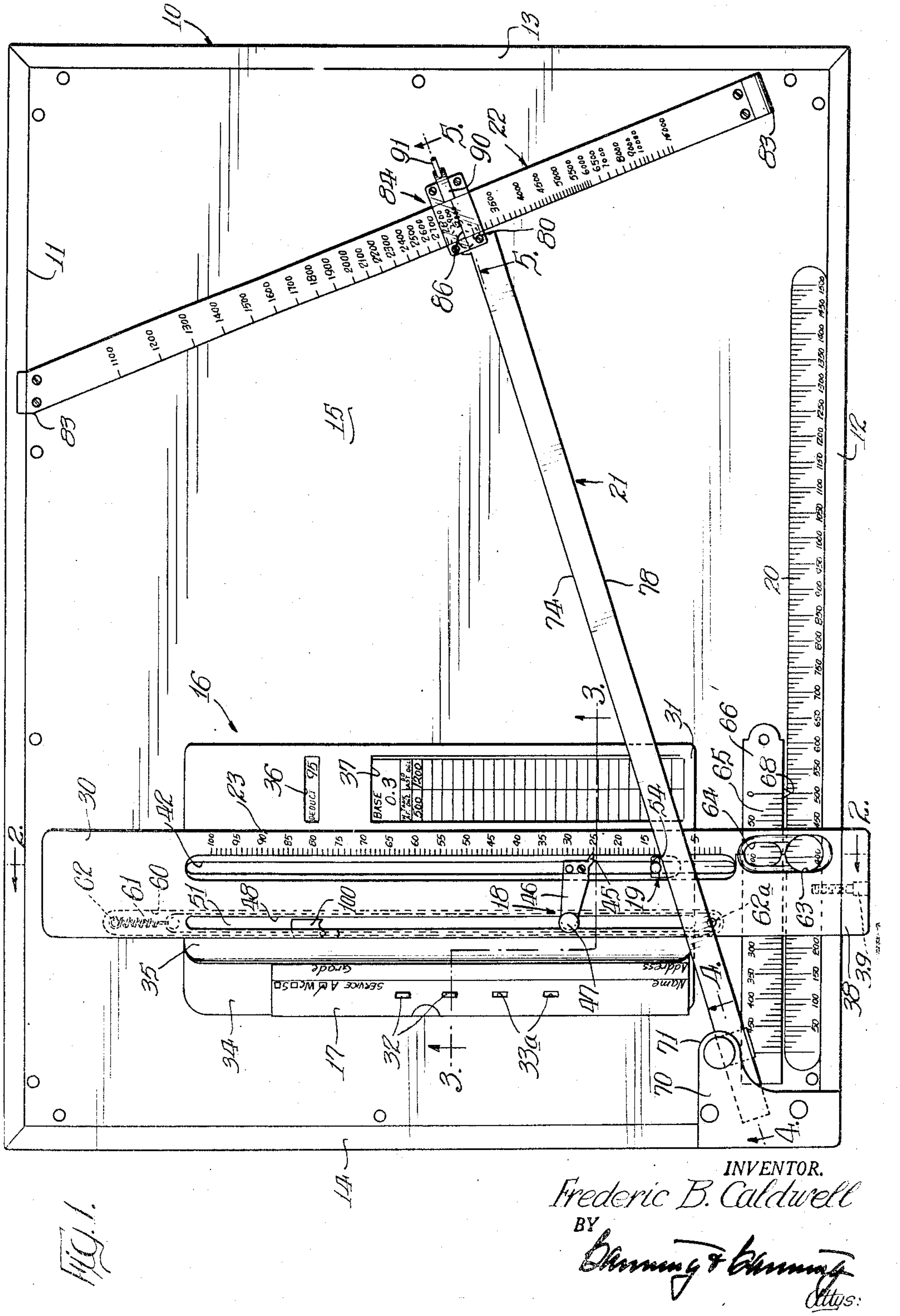

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings, there is shown in Fig. 1 a base 10 which may be in the form of a rectangular member having top and bottom sides 11 and 12 and lateral sides 13 and 14. The base may be of suitable hard material, such as aluminum or the like, to provide a flat upper surface 15. Slidable along the upper surface 15 is a carrier 16 provided with means for holding a card 17 thereon and slidably carrying an imprinting member 18 and an indexing member 19. The base is provided with a scale 20 usable with the carrier. The base 10 pivotally supports one end of an arm 21 the other end of which is slidably carried by a diagonal scale 22. The numbers on scale 22 are arranged as a sine function. The arm is positioned as to overlie the carrier 16 to be contacted by the indexing member 19.

In the utilization of the device the consumer's rate of consumption is indicated by the slant of the arm 21 as determined by the scale 22 and the carrier 16 is slid along the edge 12 to a point where the scale 20 indicates the available capacity of the consumer's storage facility. The members 18 and 19 are then separated a distance as indicated by a scale 23 equaling the total degree days accrued to the date of operation of the device, as hereinafter explained, and then the indexing member 19 is brought into contact with the arm 21. Because the members 18 and 19 are connected for movement together, the last step properly positions the member 18 whereupon the member 18 may be operated to imprint a suitable indicia to indicate the number of degree days which must accrue in the season before the available supply is depleted. The "imprinting" operation may be by actually printing, notching, or otherwise making a visible indicia on the card.

Figure 2:
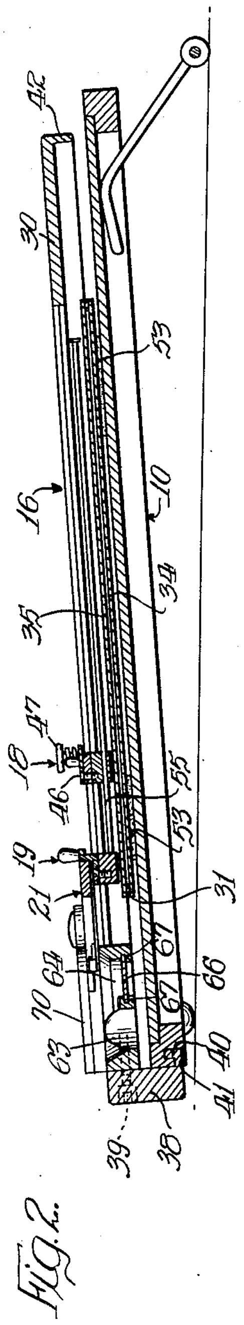
Figure 3:
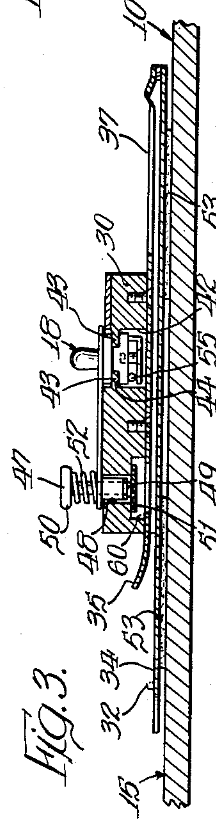

Referring now to Figs. 1, 2 and 3, the carrier 16 is provided with an elongated bar 30 which carries along its underside a rack 31 adapted to support the card 17 thereon. The rack is provided adjacent its left-hand edge (as seen in Fig. 1) with a pair of upstanding lugs 32 adapted to be received in suitable apertures provided in the card properly to position the card in the rack. A first pair of such apertures 33 and a second pair of apertures 33*a* are provided in each card so that the latter may be inverted and the reverse side used in the manner hereinafter to be explained. Suffice it to say that the rack 31 is provided with a closed lower portion 34 against which the card is seated and when the card is so seated the lugs 32 may be pressed through the apertures 33. The rack supports the card on a bottom plate 34 which is slightly spaced beneath a top plate 35 to receive the card therebetween with the top plate having a first window 36 and a second window 37 through which portions of the card are visible.

The bar 30 is held for sliding movement along the edge 12 by a metal block 38 secured to the end of the bar by a plurality of screws 39 and having an inturned tongue portion 40 slidable in a suitable groove 41 formed on the bottom of the base and extending along the edge 12. The members 18 and 19 are slidable in a suitable slot 42 formed in the bar 30 which slot is provided along each side with an inwardly extending tongue 43 engaged by suitable cutout portions 44 in each of the members. The imprinting member 18 carries a pointer 45 adjacent the scale 23 and a slightly offset arm 46 which carries a printer 47 which extends through a second slot 48 in the bar. The printer 47 is provided at its lower end with a suitable indicia-forming device, such as an arrow indicated at 49, which, upon depression of the plunger 50, first contacts an inked ribbon similar to a typewriter ribbon 51 and then the card 17 to imprint on the card the arrow 49. A spring 52 serves to return the printing portion of the imprinter to the upward position shown in Fig. 3. Felt pads 53 are provided on the bottom of the plate 34 to permit easy sliding movement of the carrier across the top surface 15 of the base.

The member 19 carries a pointer 54 adjacent the scale 23. Because of the offset of the arm 46 on the member 18, the two pointers 45 and 54 can be brought closely together along the scale. The member 19 has affixed thereto a rod 55 extending longitudinally of the slot 42 and frictionally engaged by the member 18. The frictional engagement between the member 18 and the rod is such as to cause movement of the member with movement of the member 19 but to permit the space between the members to be adjusted manually for the purposes hereinafter described. The typewriter ribbon 51 is held in a suitable enlarged portion 60 of the slot 48 by a spring 61 which has one end secured to one end of the ribbon and has its other end secured to a pin 62 fixed to the bar 30. The opposite end of the ribbon is held by a suitable pin 62*a*. To replace the ribbon it is merely necessary to unloosen the opposite end from the pin 62*a*, secure a fresh ribbon to the loosened end, and then to pull the old ribbon out and the new ribbon through the slot 60 by withdrawing the old ribbon by tension on the end adjacent the pin 62. Obviously other means of inking the arrow 49 could be provided, such as a permanent inking pad carried by the bar or the like.

The end of the bar 30 adjacent the edge 12 is provided with an aperture 63 through which the scale 20 is visible and with a second aperture 64 aligned with the aperture 63 through which a scale 65 on a subtracting device 66 is visible. The subtracting device 66 is slidably held in slots 67 formed in the lower portion of the bar 30 and carries a pointer 68 adjacent the scale 20.

Figure 4:
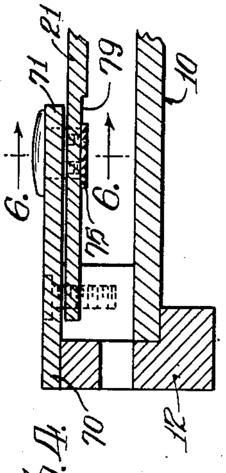

The arm 21 is secured to a fitting 70 upstanding from the top 15 of the base. The fitting 70 is provided with an arm portion 71 extending in spaced relationship above the top of the base to which arm is affixed a stud 72 which extends beneath the arm portion 71 with the portion extending beneath the arm being cut away as indicated at 73. A cutaway portion 73 is cut approximately to the center of the circular stud 72 so that the upper edge 74 of the arm 21 is aligned with the center of the stud 72. This alignment provides an accurately determined pivot point for the arm, which pivot point is located along the edge 74 thereof. To hold the arm in position a half channel member 75 is secured as by the screws 76 to the end of the arm and carries an upstanding lip 77 contacting the other edge 78 of the arm 21. The lower portion of the arm 81 adjacent the studs 72 is cut away as indicated at 79 (Fig. 4) to facilitate so mounting the arm.

Figure 5:
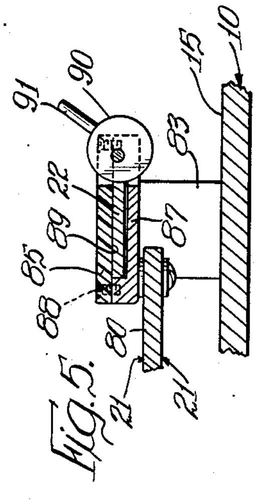

The free end 80 of the arm 21 is carried by the scale 22 which is supported by suitable posts 83 in spaced relationship above the top surface 15 of the base. The means for carrying the end 80 are best shown in Figs. 1 and 5 and include an indicating and clamping member 84 having a top plate 85 of transparent material carrying a suitable scribe line 86 and provided with a bottom plate 87 secured to the top plate 85 by the screws 88 to provide therebetween a channel 89 to receive the diagonal scale 22. A clamping wheel eccentrically mounted on the clamping member 90 may be rotated by a handle 91 so as to clamp the member 84 and hence the arm 21 in any desired position along the scale 22. It will be noted that the scribe line 86 is aligned with the edge 74 of the arm 21 so that the position of the edge 74 of the arm 21 may be aligned with the desired figures on the diagonal scale 22.

Figure 7:
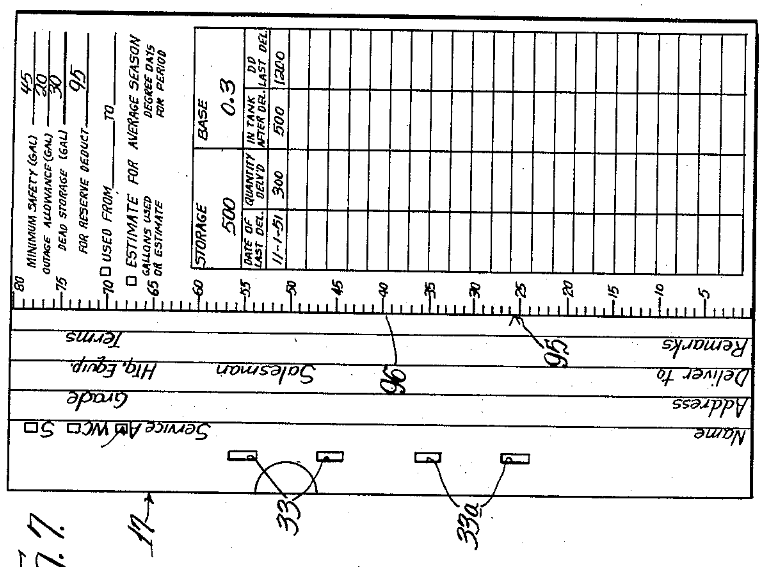
Fig. 7 is a view of a record card usable with the device.
Figure 6:
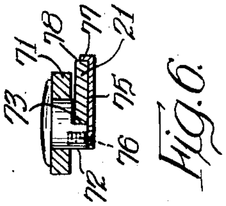
Fig. 6 is a sectional view along line 6—6 of Fig. 4.

The operation of the device so far described may perhaps best be understood by reference to a description of the card shown in Fig. 7 and of the device as used with such card. The card is provided with suitable spaces for indicating the name and address of the customer and other spaces to be checked to indicate automatic delivery, will call, or some special form of delivery. We will assume that the customer desires automatic delivery and hence that space is checked. The rate of consumption of the customer is determined as previously noted by dividing the consumption during a known period by the number of degree days which occurred in that period. Let us assume that the customer's rate or base is 0.3 gallon per degree day. This is the base which is entered on the card.

A minimum reserve is required in all cases to cover an extremely severe cold snap. In most parts of the United States it can be expected that no more than 150 degree days will accumulate in any forty-eight hour period, that is that the mean temperature will never be below −10° F. on more than two successive days. During such a cold snap deliveries may be impossible and thus a suitable minimum safety requirement is set up for the customer. If the customer uses 0.3 gallon per degree day his safety factor is 0.3 of 150 or 45 gallons and this amount is entered on the card.

If desired, the device may be used for determining the minimum safety factor by setting the scribe line 86 on the figure 3000 which is then read as .3000, moving the indexing member 19 to the figure 15 on the scale 23 (to indicate 150 degree days), and then sliding the carrier 16 along the edge 12 until the member 19 is brought into contact with the upper edge 74 of the arm 21. The figure 450 (indicating 45 gallons) will then appear centered in the aperture 63.

All storage tanks have dead storage areas, that is areas adjacent the bottom below the outlet pipe connection. For a normal 500 gallon underground tank (which let us assume the particular customer in question has) the normal dead storage is 30 gallons, and this figure is entered on the card. As it is difficult to fill any tank to its complete capacity, there is a slight outage which in such a tank is normally 20 gallons. Adding these figures gives a required reserve for this particualr customer of 95 gallons. Thus the dealer or supplier wants to refill the tank at a time when it will require approximately 405 gallons to fill the tank.

Let us assume that on November 1, 1951, 300 gallons were delivered to the customer which filled up the customer's tank. The date of delivery is inserted in the first column, the quantity delivered in the second, and, as this filled the tank, the amount in the tank on November 1 is 500. Let us further assume that in the fall season up to November 1 1200 degree days have accumulated. This figure is entered in the last column. The supplier does not know what the future weather will be but wishes to determine when a future delivery should be made to this particular customer, that is he wants to know when this customer's tank is down to 95 gallons.

To determine this, the card is inserted in the rack in the carrier 16 with the lugs being received in the apertures to position the card as shown.

The securing handle 91 is released and the arm brought down to its zero position, that is to a position parallel to the scale 20. With the indexing member 19 set at zero on the degree day scale 23, the imprinting member 18 is separated therefrom along the degree days scale until it reaches the marker 12 to indicate 1200 degree days. Thus the space between the members 18 and 19 represents the number of degree days which have accrued in the season up to the date the card is being processed. When this is accomplished the arm 21 is pivoted upwardly until the scribe line is brought adjacent the mark 3000 on the base scale 22. This indicates the customer's rate of consumption of 0.3 gallon per degree day, and the arm is clamped in this position.

While the customer has a 500 gallon tank it is desired to refill the tank when there are still 95 gallons remaining therein to give the customer the required reserve as hereinabove defined. For this purpose the subtracter 66 is slid outwardly of the arm 30 until the scribe mark thereon indicating 95 is visible in the aperture 64. Then the entire carrier 16 is moved until the pointer 68 indicates the amount of oil in the tank, namely 500 gallons. This positions the bar 30 so that the scribe lines on the scale 20 visible through the aperture 63 indicate 405. At this point the indexing member 19 is slid downwardly in the slot 42 until it contacts the portion of the edge 74 which crosses the slot. Such movement of the indexing member 19, of course, moves the imprinting member 18 therewith. When contact has been made between the member 19 and the arm, the plunger 50 is depressed which imprints an arrow 95 on a scale 96 printed on the card. It will be noted that this arrow is opposite the scribe mark 255 on the scale 96. Thus when 2550 degree days have accrued in the season the storage tank of this particular customer will be down to the 95 gallons necessary reserve.

The card may then be filed in a degree day file and as the degree days accumulate from day to day the cards previously processed are withdrawn from the file until the time when 2550 degree days have accumulated, at which time this particular customer's card will be withdrawn and at which time he should require 405 gallons of oil for delivery.

Where a card is being processed near the end of the heating season and a great number of degree days have been accumulated so that the members 18 and 19 are relatively widely spaced, it may happen that positioning of the indexing member locates the imprinting member beyond the card so that no printing would occur. To prevent any error from arising because of such a situation, there is provided a warning flag 100 pivotally mounted on the bar 30 and positioned to be contacted by the imprinting member if it is moved therebeyond. Contact of the imprinting member with the flag rotates it from its hidden position beneath the bar to visible position to display a signal to the operator.

Each card is identically printed on both sides and thus may be used for two seasons. During the second season the opposite side of the card is used and hence the two apertures 33*a* are positioned on the lugs. In extreme climates, such as Canada, where more than 8,000 degree days are apt to accrue in a season, the column 96 on one face of the card may be continued on the other face up to 10,000 or more degree days. In such cases, however, the card me be used only for one season and only the apertures 33 are provided in such cards.

I claim:

1. A meterological metering device comprising a base, a carrier slidably mounted on the base, means on the carrier for positioning a card thereon with the card having a printed column of figures indicating degree days, a pair of adjustably connected members slidably mounted on the carrier, means on one of the members for imprinting a visible indicia on the card adjacent said column, a scale on the carrier calibrated in degree days to facilitate connecting the members together in spaced relationship corresponding to the seasonal elapsed degree days, an arm having one end pivoted to the base and having a portion extending over the carrier and adapted to be contacted by the other member to position the members on the carrier, a scale diagonally arranged on the base and slidably supporting the other end of said arm and calibrated in rate of consumption of fuel per degree days, and a scale on the base adjacent the path of sliding movement of the carrier and calibrated in storage capacity whereby said carrier may be set at the proper storage capacity and said arm set at the proper consumption rate and said other member moved into contact with said portion of the arm properly to position the imprinting means to imprint said indicia on the column to indicate the number of degree days to accumulate before refilling of the storage facility is required.

2. A meteorological metering device comprising a base, a carrier slidably mounted on the base, means on the carrier for positioning a card thereon with the card having a printed column of figures indicating degree days, a pair of adjustably connected members slidably mounted on the carrier, means on one of the members for imprinting a visible indicia on the card adjacent said column, a scale on the carrier calibrated in degree days to facilitate connecting the members together in spaced relationship corresponding to the seasonal elapsed degree days, an arm having one end pivoted to the base and having a portion extending over the carrier and adapted to be contacted by the other member to position the members on the carrier, a scale diagonally arranged on the base and slidably supporting the other end of said arm and calibrated in rate of consumption of fuel per degree days, a scale on the base adjacent the path of sliding movement of the carrier and calibrated in storage capacity, and a subtracter scale secured to the carrier and extendable therefrom to indicate a required reserve, said subtracter scale carrying a pointer whereby said pointer may be set at the storage capacity properly to position the carrier to indicate storage capacity less reserve and said arm set at the proper consumption rate and said other member moved into contact with said portion of the arm properly to position the imprinting means to imprint said indicia on the column to indicate the number of degree days to accumulate before refilling of the storage facility is required.

3. A meteorological metering device comprising a base, a carrier slidably mounted on the base, means on the carrier for positioning a card thereon with the card having a printed column of figures indicating degree days and having spaces to indicate the rate of consumption of fuel per degree day and a required reserve, windows in the card positioning means through which said rate and reserve are visible, a pair of adjustably connected members slidably mounted on the carrier, means on one of the members for imprinting a visible indicia on the card adjacent said column, a scale on the carrier calibrated in degree days to facilitate connecting the members together in spaced relationship corresponding to the seasonal elapsed degree days, an arm having one end pivoted to the base and having a portion extending over the carrier and adapted to be contacted by the other member to position the members on the carrier, a scale diagonally arranged on the base and slidably supporting the other end of said arm and calibrated in rate of consumption of fuel per degree day, a scale on the base adjacent the path of sliding movement of the carrier and calibrated in storage capacity, and a subtracter scale secured to the carrier and extendable therefrom to indicate the required reserve, said subtracter scale carrying a pointer whereby said pointer may be set at the storage capacity properly to position the carrier to indicate storage capacity less reserve and said arm set at the proper consumption rate and said other member moved into contact with said portion of the arm properly to position the imprinting means to imprint said indicia on the column to indicate the number of degree days to accumulate before refilling of the storage facility is required.

4. A meteorological metering device comprising a base, a carrier slidably mounted on the base, means on the carrier for positioning a card thereon with the card having a printed column of figures indicating degree days and having spaces to indicate the rate of consumption of fuel per degree day and a required reserve, windows in the card positioning means through which said rate and reserve are visible, a pair of adjustably connected members slidably mounted on the carrier, means on one of the members for imprinting a visible indicia on the card adjacent said column, a scale on the carrier calibrated in degree days to facilitate connecting the members together in spaced relationship corresponding to the seasonal elapsed degree days, an arm having one end pivoted to the base and having a portion extending over the carrier and adapted to be contacted by the other member to position the members on the carrier, a scale diagonally arranged on the base and slidably supporting the other end of said arm and calibrated in rate of consumption of fuel per degree day, and a scale on the base adjacent the path of sliding movement of the carrier and calibrated in storage capacity whereby said carrier may be set at the proper storage capacity less the required reserve and said arm set at the proper consumption rate and said other member moved into contact with said portion of the arm properly to position the imprinting means to imprint said indicia on the column to indicate the number of degree days to accumulate before refilling of the storage facility is required.

5. Apparatus for determining the repletion requirements of a material consumed at a predetermined rate which rate is accelerated or decelerated in accordance with variations, measurable in increments, of an unpredictable condition, comprising, a base, a carrier movably mounted on the base, a pair of members slidably mounted on the carrier and separable to represent total accrued increments, means connecting the members for movement together, means for positioning one of the members including an arm pivoted on the base and angularly displaceable to represent said rate, said carrier being movable to a position to represent the available supply of the material to bring a portion of said arm into the path of movement of the last-mentioned member whereby said last-mentioned member may be brought into contact with said portion to position the other member to indicate increments necessarily accruable again to deplete said supply.

FREDERIC B. CALDWELL.

REFERENCES CITED

The following references are of record in the file of this patent:

UNITED STATES PATENTS

| Number | Name | Date |
|---|---|---|
| 2,097,835 | Epps | Nov. 2, 1937 |
| 2,225,905 | Clement | Dec. 24, 1940 |
| 2,489,401 | Coplan | Nov. 29, 1949 |